(12) United States Patent
Fukuda et al.

(10) Patent No.: US 10,833,776 B2
(45) Date of Patent: Nov. 10, 2020

(54) COMMUNICATION SYSTEM AND COMMUNICATION METHOD, AND RECEIVER

(71) Applicant: SONY CORPORATION, Tokyo (JP)

(72) Inventors: Shinichi Fukuda, Kanagawa (JP); Osamu Kozakai, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/060,664

(22) PCT Filed: Dec. 5, 2016

(86) PCT No.: PCT/JP2016/086058
§ 371 (c)(1),
(2) Date: Jun. 8, 2018

(87) PCT Pub. No.: WO2017/115616
PCT Pub. Date: Jul. 6, 2017

(65) Prior Publication Data
US 2018/0287717 A1    Oct. 4, 2018

(30) Foreign Application Priority Data
Dec. 28, 2015   (JP) .................................. 2015-256641

(51) Int. Cl.
*H04B 13/00*    (2006.01)
*G06F 3/01*    (2006.01)

(52) U.S. Cl.
CPC .......... *H04B 13/005* (2013.01); *G06F 3/015* (2013.01)

(58) Field of Classification Search
CPC combination set(s) only.
See application file for complete search history.

(56) References Cited

U.S. PATENT DOCUMENTS 6,542,717 B1 * 4/2003 Zimmerman ...... G06K 7/10336
455/100
8,082,040 B2 * 12/2011 Ibrahim ............... A61N 1/0541
607/115

(Continued)

FOREIGN PATENT DOCUMENTS

JP    2011004177 A  *  1/2011
JP    2011004177 A     1/2011

(Continued)

OTHER PUBLICATIONS

Nanba, Hideo,JP-2012113649-A Translation,Jun. 2012 (Year: 2012).*

(Continued)

*Primary Examiner* — Yuwen Pan
*Assistant Examiner* — Erica L Fleming-Hall
(74) *Attorney, Agent, or Firm* — Chip Law Group

(57) ABSTRACT

A communication system of the disclosure includes: a transmitter that includes a first transmitting electrode and a second transmitting electrode, and causes a transmission signal to be generated between the first transmitting electrode and the second transmitting electrode; and a receiver including a first receiving electrode, a second receiving electrode, and a determiner, in which the first receiving electrode and the second receiving electrode each receive the transmission signal through a communication path that includes a human body, and the determiner determines that communication is valid in a case where a reception signal, generated between the first receiving electrode and the second receiving electrode, has a prescribed polarity, and determines that the communication is invalid in a case where the reception signal has a polarity different from the prescribed polarity.

9 Claims, 12 Drawing Sheets

(56) References Cited

U.S. PATENT DOCUMENTS

| | | | |
|---|---|---|---|
| 2009/0096556 A1* | 4/2009 | Washiro | H01Q 1/36 333/24 R |
| 2010/0315206 A1* | 12/2010 | Schenk | A61B 5/0024 340/286.01 |

FOREIGN PATENT DOCUMENTS

| | | | |
|---|---|---|---|
| JP | 2011-120145 A | | 6/2011 |
| JP | 2011120145 A | * | 6/2011 |
| JP | 2011120145 A | | 6/2011 |
| JP | 2012-113649 A | | 6/2012 |
| JP | 2012113649 A | * | 6/2012 |
| JP | 2012-235221 A | | 11/2012 |
| JP | 2012235221 A | * | 11/2012 |
| JP | 5186471 B2 | | 4/2013 |
| JP | 5320179 B2 | | 10/2013 |

OTHER PUBLICATIONS

Mizota, Tsutomu, JP-2012235221-A Translation, Nov. 2012 (Year: 2012).*

Morisawa, Fumiharu, JP-2011120145-A Translation, Jun. 2011 (Year: 2011).*

International Search Report and Written Opinion of PCT Application No. PCT/JP2016/086058, dated Feb. 21, 2017, (Year: 2017).*

Minoya, Naoshi, JP-2011004177 Patent Publication Translation (Year: 2011).*

International Search Report and Written Opinion of PCT Application No. PCT/JP2016/086058, dated Feb. 21, 2017, 07 pages of ISRWO.

Extended European Search Report of EP Patent Application No. 16881596.7, dated Dec. 20, 2018, 08 pages.

* cited by examiner

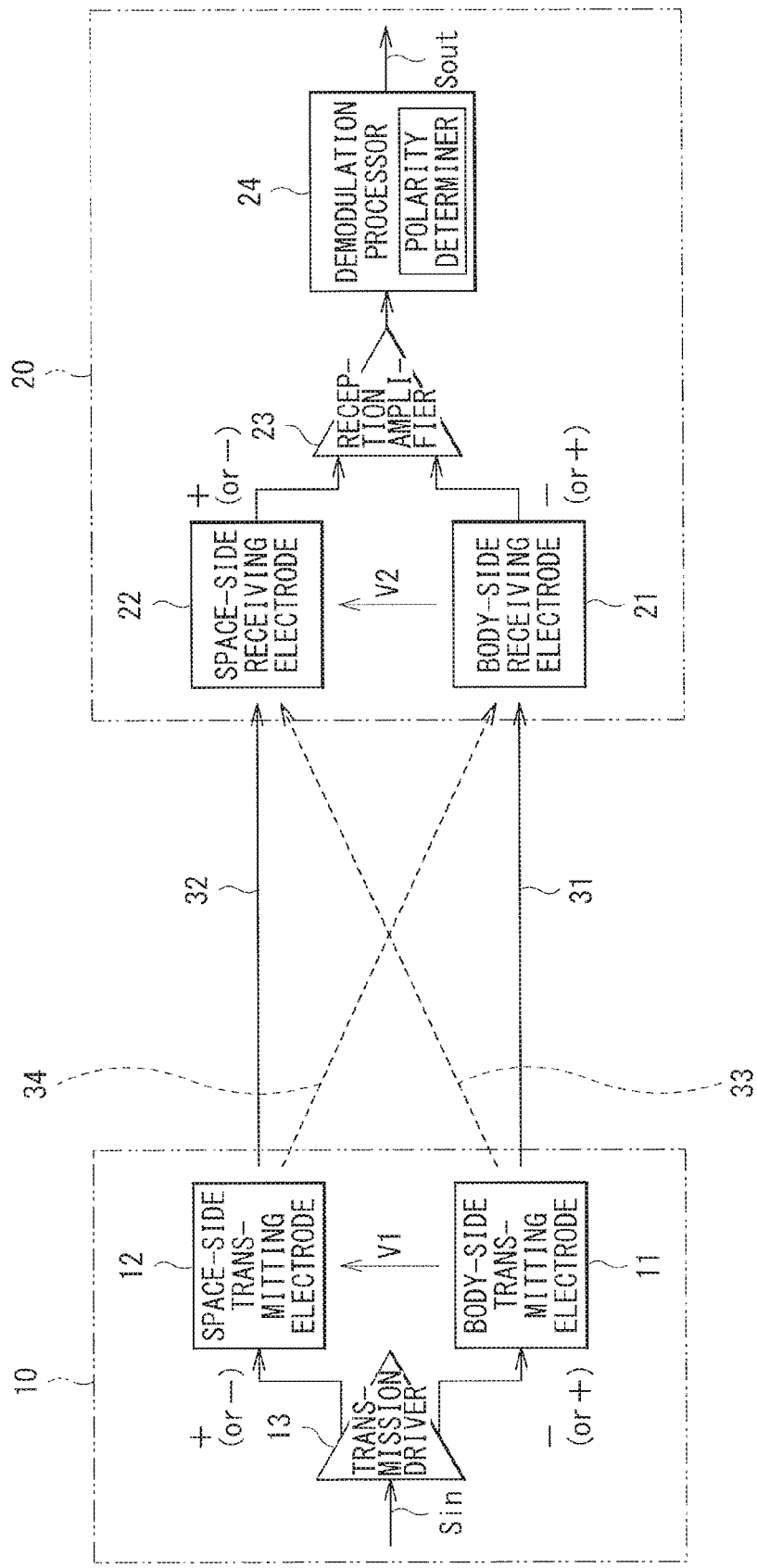
[FIG. 1]

[FIG. 2]
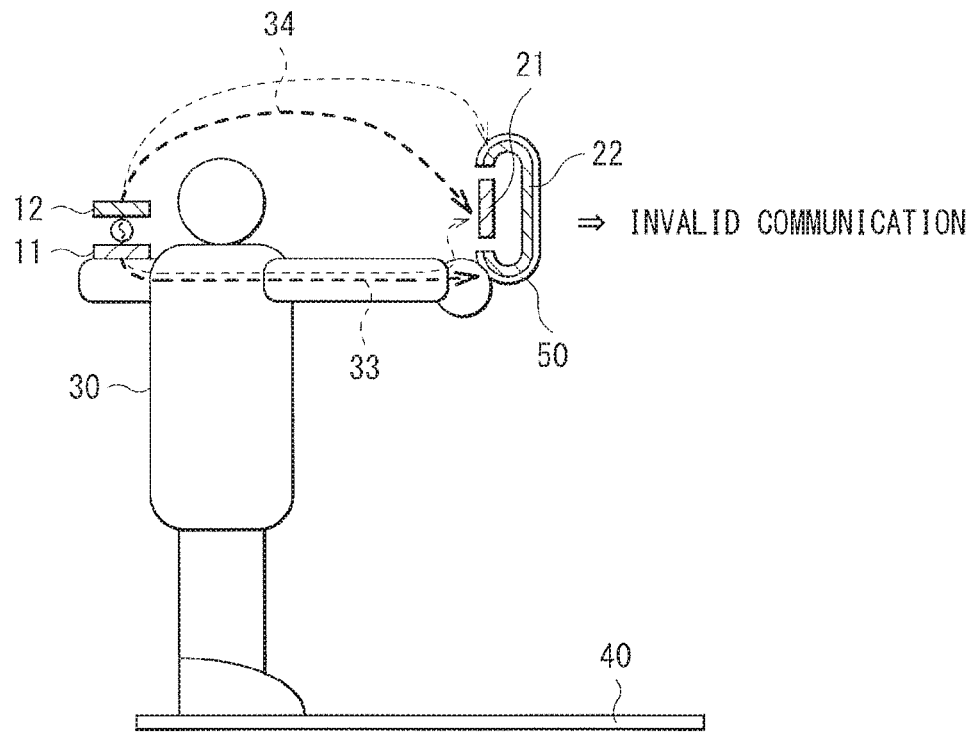
[FIG. 3]
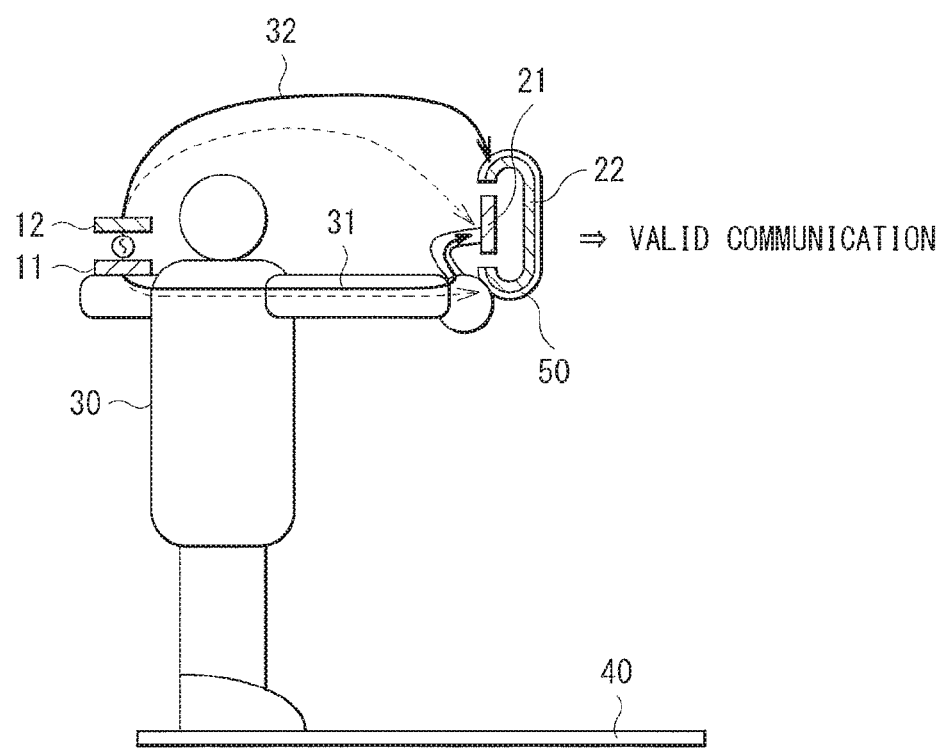

[FIG. 4]
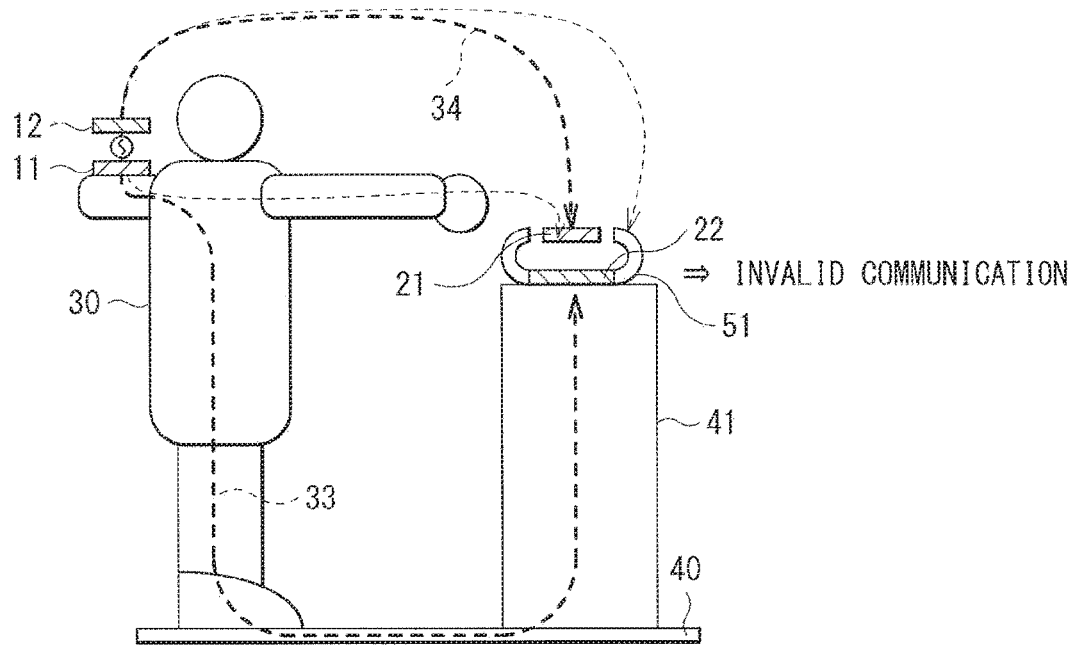
[FIG. 5]
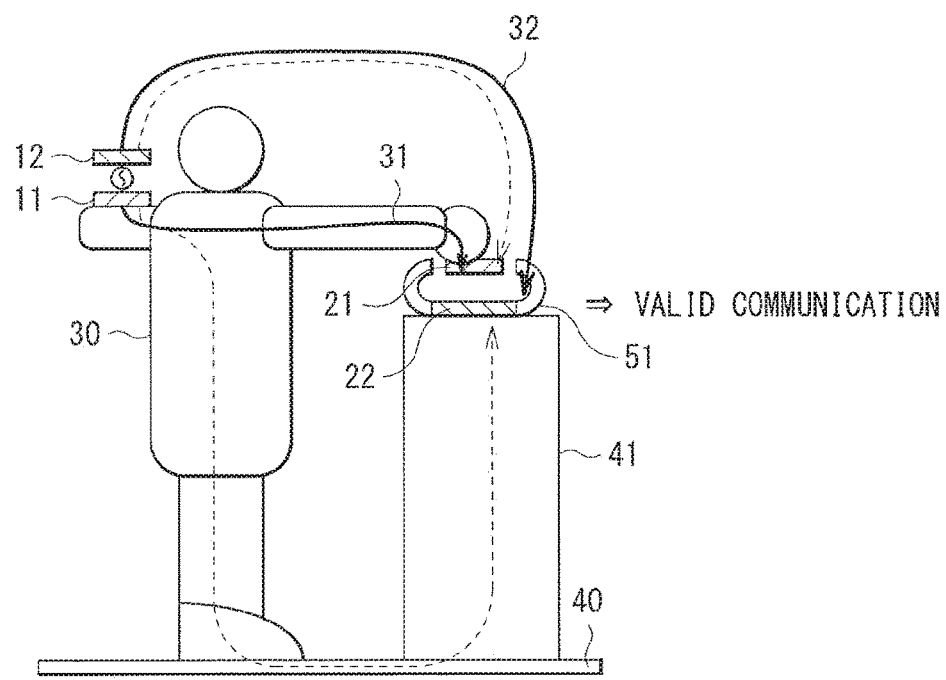

[FIG. 6]
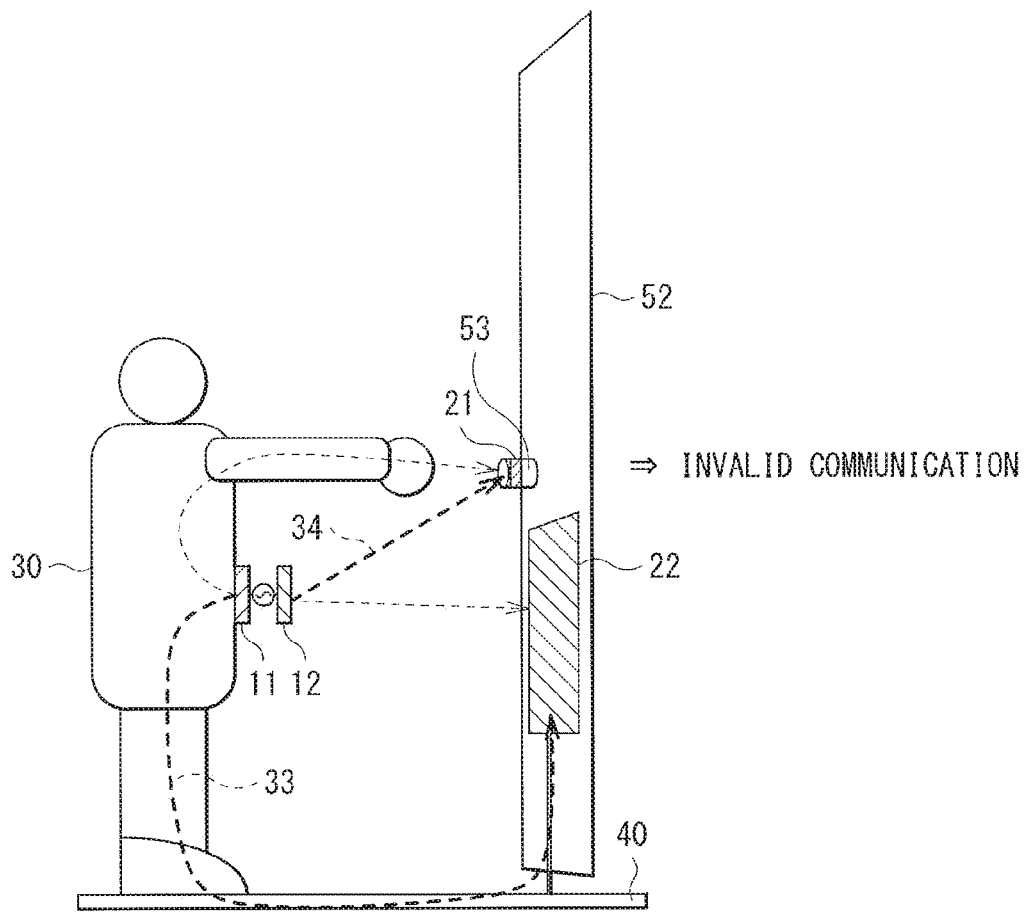

[ FIG. 7 ]
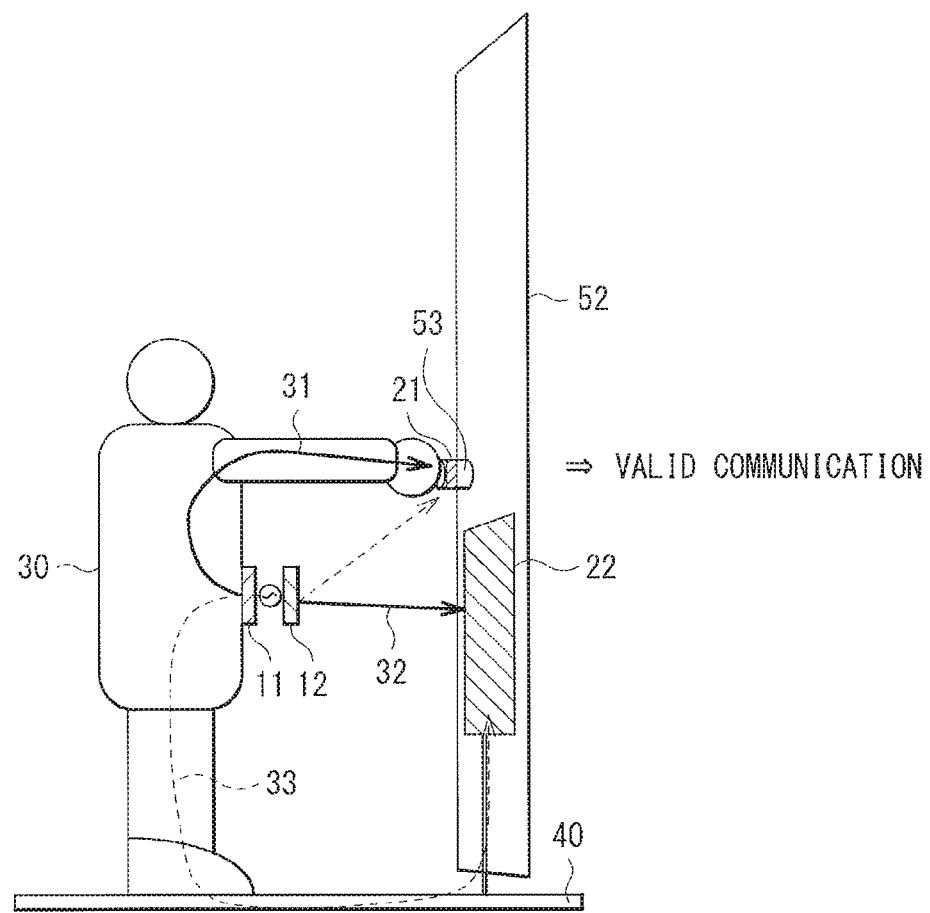

[FIG. 8]
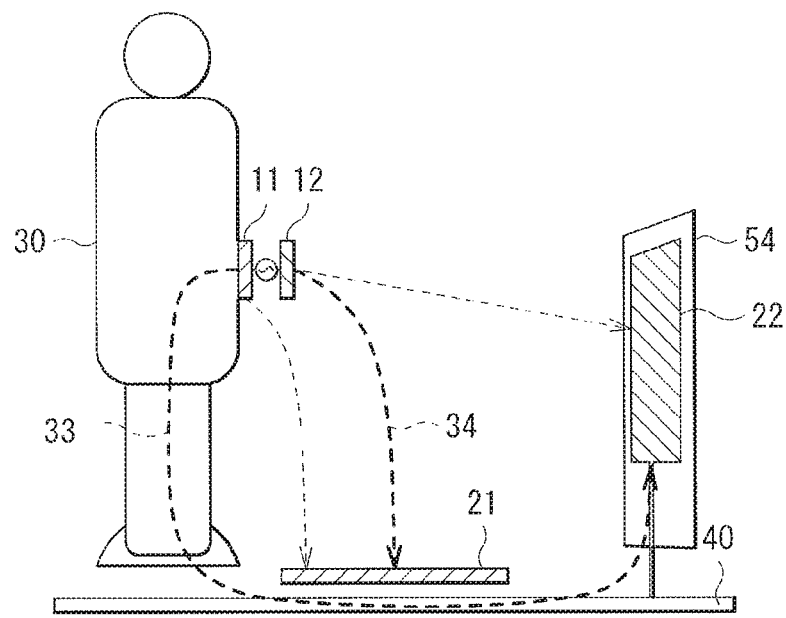
⇒ INVALID COMMUNICATION
[FIG. 9]
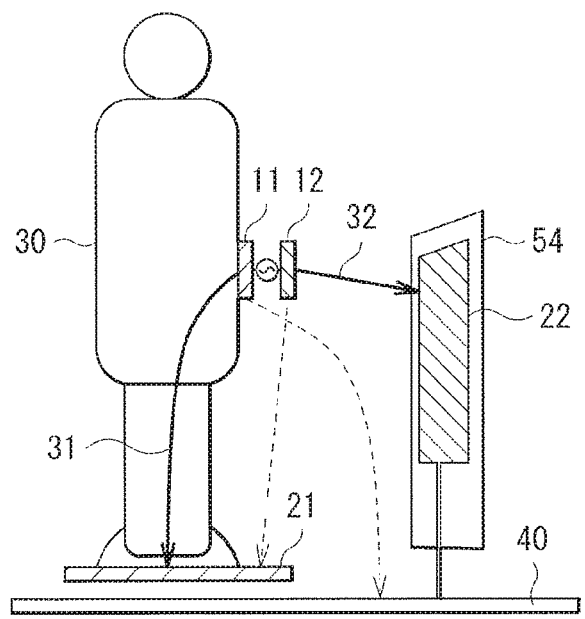
⇒ VALID COMMUNICATION

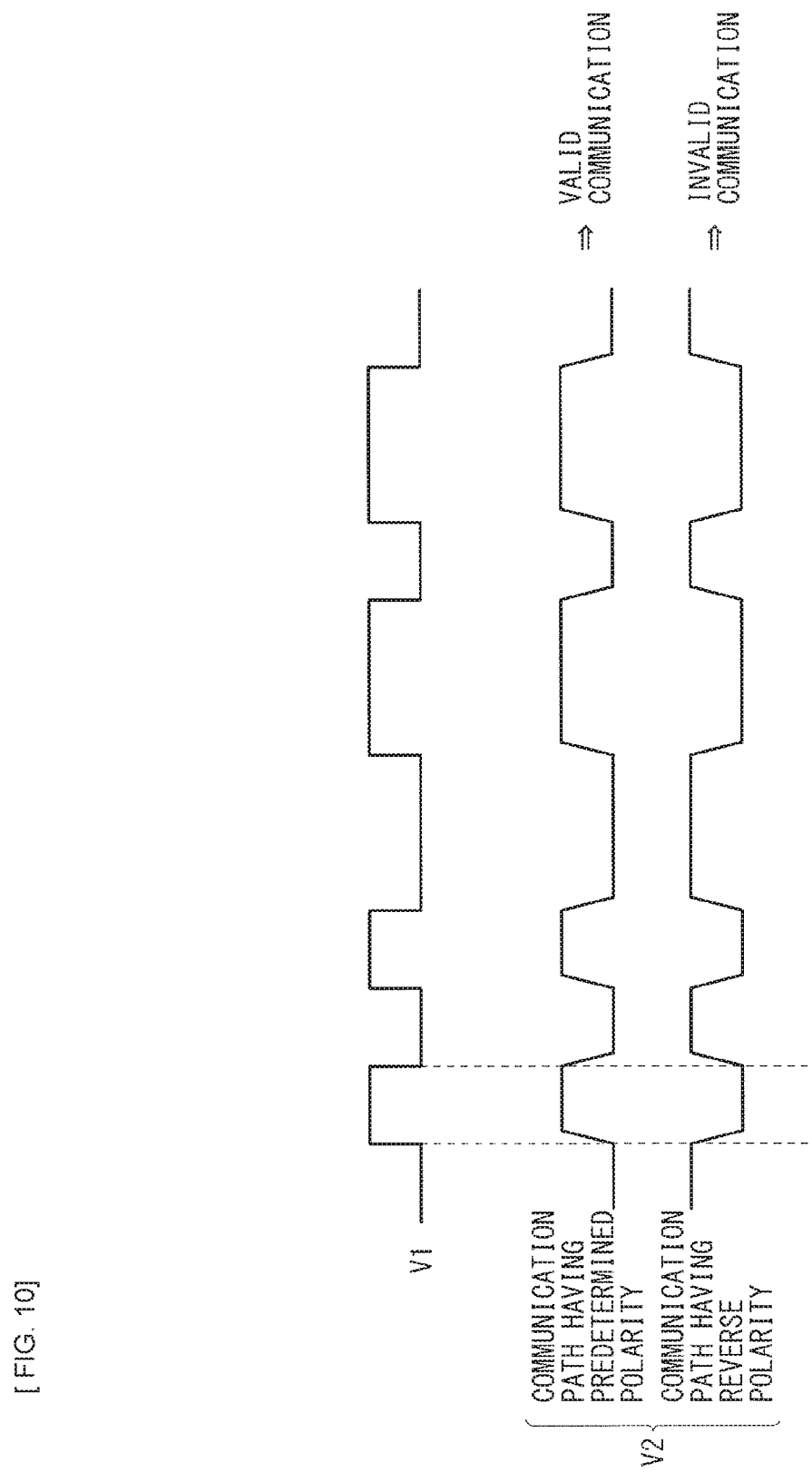
[FIG. 10]

[FIG. 11]
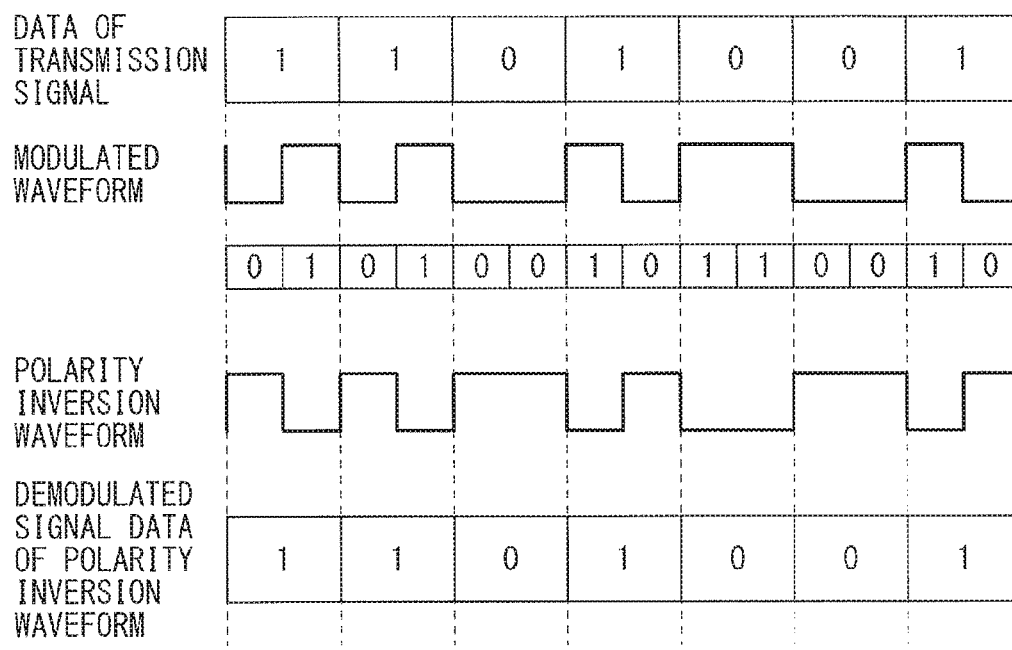
[FIG. 12]
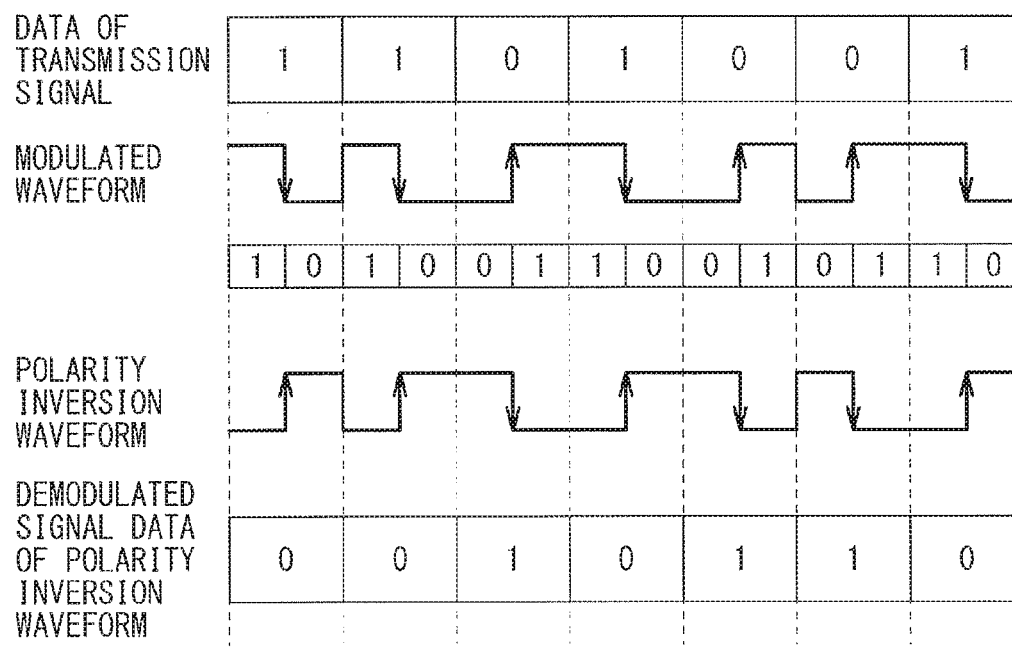

[ FIG. 13]
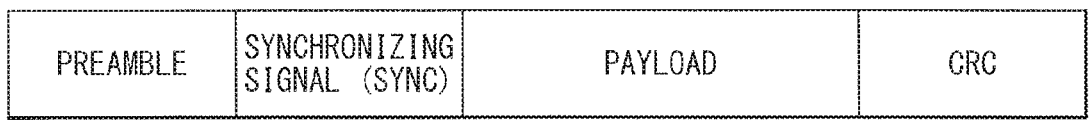
[ FIG. 14]
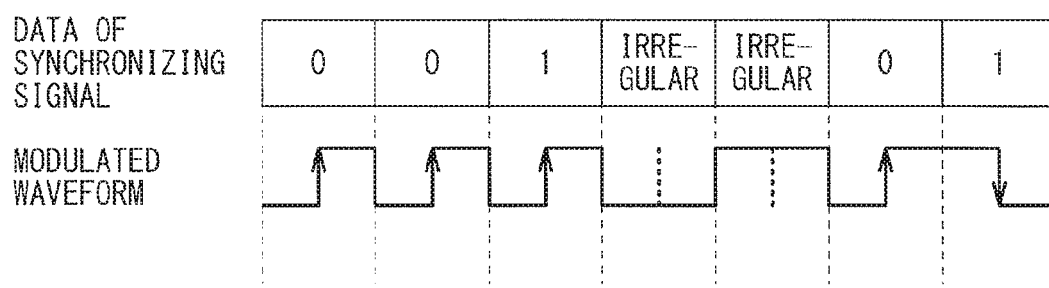

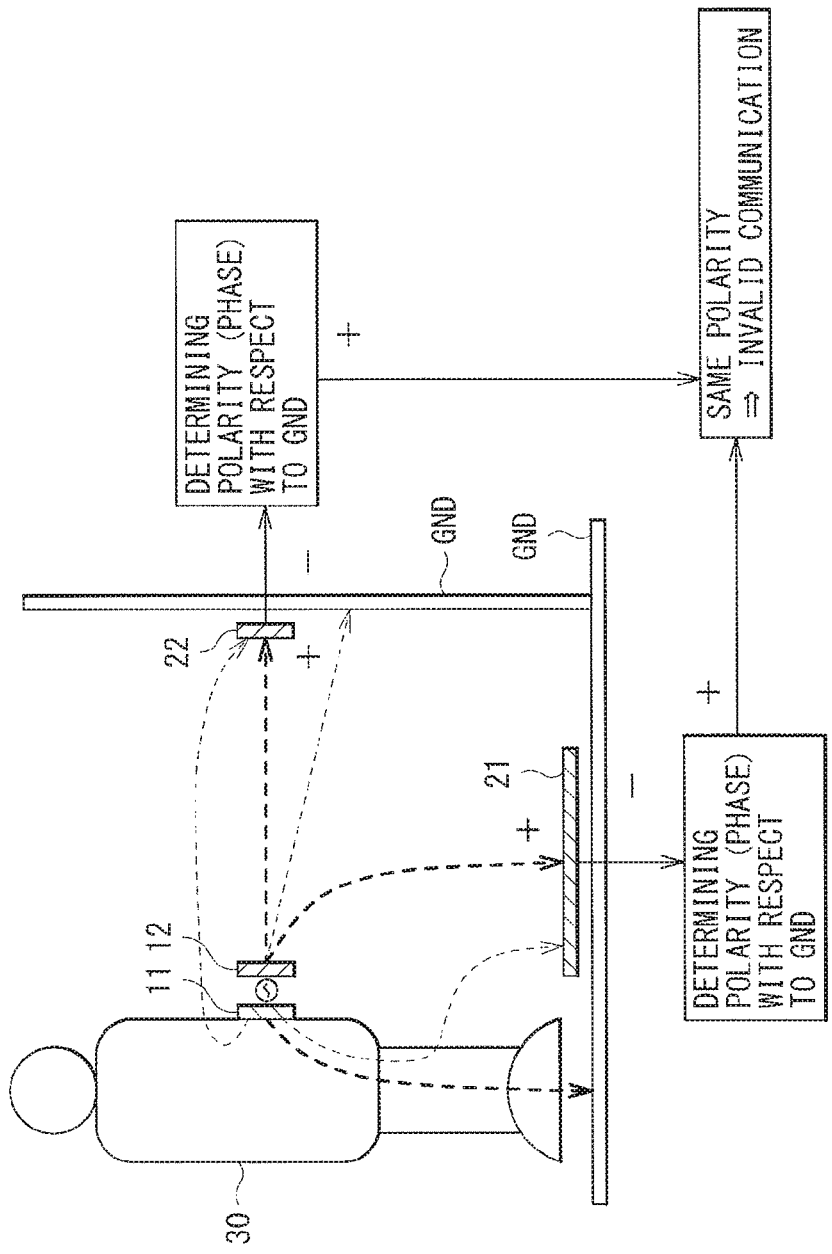

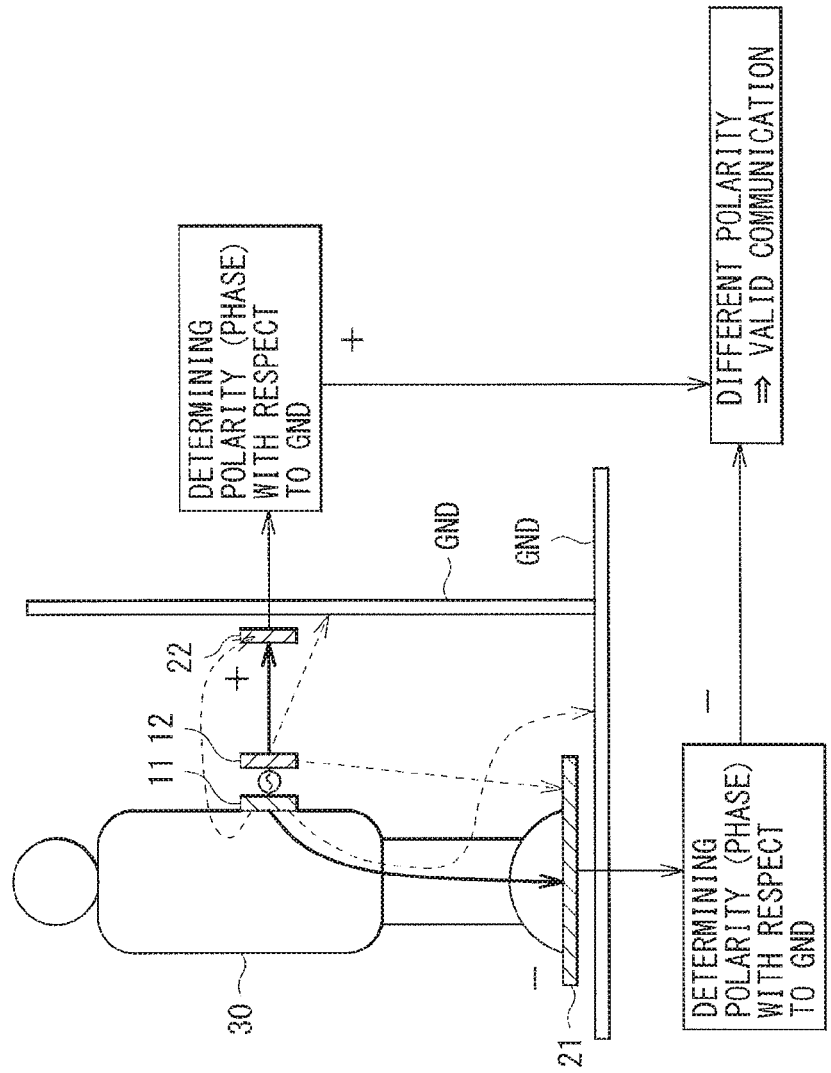
[FIG. 16]

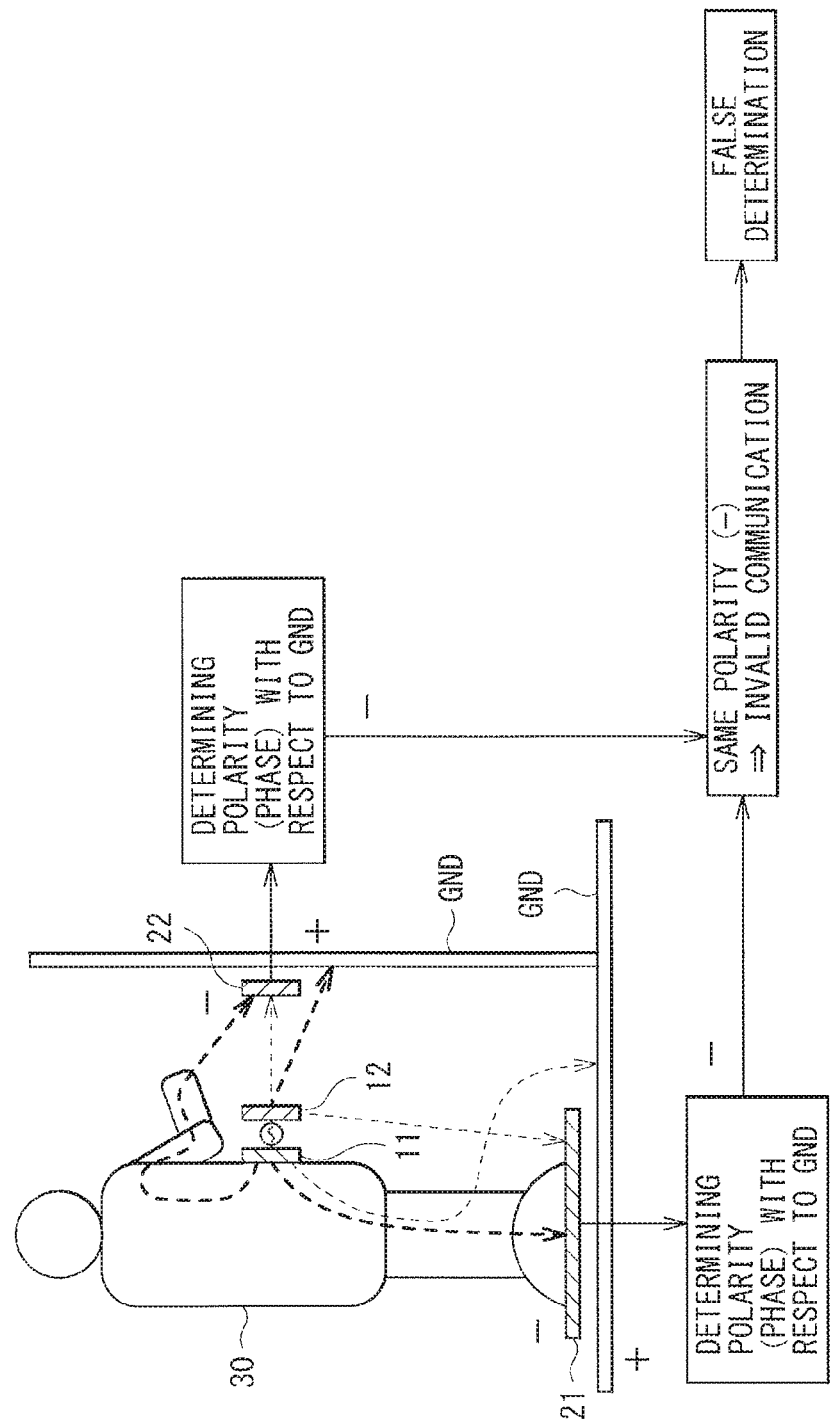

COMMUNICATION SYSTEM AND COMMUNICATION METHOD, AND RECEIVER

CROSS REFERENCE TO RELATED APPLICATIONS

This application is a U.S. National Phase of International Patent Application No. PCT/JP2016/086058 filed on Dec. 5, 2016, which claims priority benefit of Japanese Patent Application No. JP 2015-256641 filed in the Japan Patent Office on Dec. 28, 2015. Each of the above-referenced applications is hereby incorporated herein by reference in its entirety.

TECHNICAL FIELD

The disclosure relates to a communication system and a communication method, and a receiver that are preferable for a body area network (BAN: Body Area Network).

BACKGROUND ART

As a communication system that includes a transmitter, a communication medium, and a receiver, a communication technology using a human body as a communication medium is particularly referred to as BAN. Technological development is expected for what is called "communication through touch", i.e., a technology that allows a user to carry out communication simply by touching a receiving electrode through BAN. It is also expected that the technology will be used in a security field, for example, unlocking doors, etc. through the BAN.

CITATION LIST

Patent Literature

PTL 1: Japanese Unexamined Patent Application Publication No. 2011-120145

SUMMARY OF THE INVENTION

In BAN, a user wears a transmitter that includes a body-side transmitting electrode and a space-side transmitting electrode. A receiver includes a body-side receiving electrode that receives a signal from the body-side transmitting electrode through a communication path that includes a human body as a communication medium, and a space-side receiving electrode that receives a signal through a communication path that includes space as a communication medium. In the BAN, a person, without even touching the body-side receiving electrode, may possibly set off unintended communication simply by approaching the body-side receiving electrode or the space-side receiving electrode. Since space has high impedance in the communication path of the BAN, communication using the space as the communication medium is more dominant. Whereas, variation of impedance for an entire system is small between a case of touching the body-side receiving electrode and a case of not touching the body-side receiving electrode, and variation in signal level is small in the communication path that includes the human body as the communication medium. The receiver is caused to carry out reception once either a reception signal level or a Signal-to-Noise Ratio (SNR) reaches a decodable level. This results in occurrence of a phenomenon in which communication is performed without the receiving electrode being touched. Such a phenomenon is considered to be an unavoidable phenomenon peculiar to the BAN.

In PTL 1, suggested is a technique that determines whether or not communication is valid by transmitting, between the body-side transmitting electrode and the space-side transmitting electrode, a transmission signal having a phase (polarity) that is different between each other, and determining the polarity of the signal on a receiving side. However, in the technique described in PLT 1, since the polarity is determined using ground potential (GND), it is necessary to provide the GND as a constituent element. In addition, to determine the polarity with respect to the GND for each of the body-side receiving electrode and the space-side receiving electrode, it is necessary to provide two separate circuits. In addition, according to the technique as described in PTL 1, there is a possibility of causing an error in polarity identification.

It is desirable to provide a communication system and a communication method, and a receiver that enable communication only in a prescribed communication path.

A communication system according to an embodiment of the disclosure includes: a transmitter that includes a first transmitting electrode and a second transmitting electrode, and causes a transmission signal to be generated between the first transmitting electrode and the second transmitting electrode; and a receiver including a first receiving electrode, a second receiving electrode, and a determiner, in which the first receiving electrode and the second receiving electrode each receive the transmission signal through a communication path that includes a human body, and the determiner determines that communication is valid in a case where a reception signal has a prescribed polarity, and determines that the communication is invalid in a case where the reception signal has a polarity different from the prescribed polarity. The reception signal is generated between the first receiving electrode and the second receiving electrode.

A communication method according to an embodiment of the disclosure includes: generating, in a transmitter that includes a first transmitting electrode and a second transmitting electrode, a transmission signal between the first transmitting electrode and the second transmitting electrode; and determining, in a receiver that includes a first receiving electrode and a second receiving electrode each receiving the transmission signal through a communication path that includes a human body, that communication is valid in a case where a reception signal has a prescribed polarity, and that the communication is invalid in a case where the reception signal has a polarity different from the prescribed polarity, the reception signal being generated between the first receiving electrode and the second receiving electrode.

A receiver according to an embodiment of the disclosure includes: a first receiving electrode and a second receiving electrode each receiving a transmission signal through a communication path that includes a human body, in which the transmission signal is generated between a first transmitting electrode and a second transmitting electrode; and a determiner determining that communication is valid in a case where a reception signal has a prescribed polarity, and determining that the communication is invalid in a case where the reception signal has a polarity different from the prescribed polarity. The reception signal is generated between the first receiving electrode and the second receiving electrode.

In the communication system or the communication method, or the receiver according to the embodiment of the disclosure, in the transmitter including the first transmitting electrode and the second transmitting electrode, the transmission signal is generated between the first transmitting electrode and the second transmitting electrode. In the receiver including the first receiving electrode and the second receiving electrode each of which receives the transmission signal through the communication path that includes the human body, it is determined that the communication is valid in a case where the reception signal generated between the first receiving electrode and the second receiving electrode has the prescribed polarity, and that the communication is invalid in a case where the reception signal has the polarity different from the prescribed polarity.

According to the communication system or the communication method, or the receiver of the embodiment of the disclosure, it is determined that the communication is valid in a case where the reception signal generated between the first receiving electrode and the second receiving electrode has the prescribed polarity, and that the communication is invalid in a case where the reception signal has the polarity different from the prescribed polarity. This makes it possible to enable communication only in a predetermined communication path.

It is to be noted that effects described here are not necessarily limited, and may include any of the effects described in the disclosure.

BRIEF DESCRIPTION OF THE DRAWINGS

FIG. 1 is a configuration diagram that illustrates an example of a basic configuration of a communication system according to a first embodiment of the disclosure.

FIG. 2 is a configuration diagram that illustrates one example of a case where invalid communication is performed in a first example of a mode of use of the communication system.

FIG. 3 is a configuration diagram that illustrates one example of a case where valid communication is performed in the first example of the mode of use of the communication system.

FIG. 4 is a configuration diagram that illustrates one example of a case where invalid communication is performed in a second example of the mode of use of the communication system.

FIG. 5 is a configuration diagram that illustrates one example of a case where valid communication is performed in the second example of the mode of use of the communication system.

FIG. 6 is a configuration diagram that illustrates one example of a case where invalid communication is performed in a third example of the mode of use of the communication system.

FIG. 7 is a configuration diagram that illustrates one example of a case where valid communication is performed in the third example of the mode of use of the communication system.

FIG. 8 is a configuration diagram that illustrates one example of a case where invalid communication is performed in a fourth example of the mode of use of the communication system.

FIG. 9 is a configuration diagram that illustrates one example of a case where valid communication is performed in the fourth example of the mode of use of the communication system.

FIG. 10 is a waveform diagram that illustrates one example of a signal waveform of each of a transmission signal and a reception signal.

FIG. 11 is an explanatory diagram that illustrates one example of a modulation scheme that is not usable for polarity identification.

FIG. 12 is an explanatory diagram that illustrates one example of a modulation scheme that is usable for the polarity identification.

FIG. 13 is an explanatory diagram that illustrates one example of a packet configuration of the transmission signal.

FIG. 14 is an explanatory diagram that illustrates one example of a synchronizing signal.

FIG. 15 is a configuration diagram that illustrates one example of a case where invalid communication is performed in a communication system according to a comparative example.

FIG. 16 is a configuration diagram that illustrates one example of a case where valid communication is performed in the communication system according to the comparative example.

FIG. 17 is a configuration diagram that illustrates one example of a case where a false determination is performed in the communication system according to the comparative example.

MODES FOR CARRYING OUT THE INVENTION

In the following, some embodiments of the disclosure are described in detail with reference to the drawings. It is to be noted that descriptions are given in the following order:
1. First Embodiment
  1.1 Overview of Communication System (FIG. 1)
  1.2 Specific Mode of Use of Communication System (FIGS. 2 to 9)
  1.3 Specific Example of each of Transmission Signal and Reception Signal (FIGS. 10 to 14)
  1.4 Effects
  1.5 Comparative Example (FIGS. 15 to 17)
2. Other Embodiments 1. First Embodiment 1.1 Overview of Communication System FIG. 1 illustrates an example of a basic configuration of a communication system according to a first embodiment of the disclosure.

The communication system according to the embodiment of the disclosure includes a transmitter 10 and a receiver 20.

The transmitter 10 includes a body-side transmitting electrode 11 as a first transmitting electrode, a space-side transmitting electrode 12 as a second transmitting electrode, and a transmission driver 13.

The receiver 20 includes a body-side receiving electrode 21 as a first receiving electrode, a space-side receiving electrode 22 as a second receiving electrode, a reception amplifier 23, and a demodulation processor 24 including a polarity determiner.

To the transmission driver 13, an input signal Sin that is an original signal for the transmission signal is inputted. As described later, the transmission driver 13 generates, between the body-side transmitting electrode 11 and the space-side transmitting electrode 12, the transmission signal including a signal modulated in accordance with a predetermined modulation scheme in which a value, when demodulated, changes upon inversion of the polarity of the signal. The body-side transmitting electrode 11 is disposed at a side closer to a human body than to the space-side transmitting electrode 12.

In this communication system, with a portion of a human body coming closer to the body-side receiving electrode 21 than to the space-side receiving electrode 22 and having contact with the body-side receiving electrode 21, a body-side communication path 31 that is prescribed and includes the human body as the communication medium is established as a first communication path between the body-side transmitting electrode 11 and the body-side receiving electrode 21. In addition, between the space-side transmitting electrode 12 and the space-side receiving electrode 22, a space-side communication path 32 that is prescribed and includes the space (for example, air) as the communication medium is established as a second communication path.

The reception amplifier 23 amplifies, and outputs to the demodulation processor 24, a reception signal generated between the body-side receiving electrode 21 and the space-side receiving electrode 22. It is to be noted that the reception amplifier 23 may be an inverting amplifier.

The demodulation processor 24 determines that communication is valid in a case where the reception signal generated between the body-side receiving electrode 21 and the space-side receiving electrode 22 has a prescribed polarity (phase), and determines that the communication is invalid in a case where the reception signal has a polarity different from the prescribed polarity.

Here, the case where the polarity is the prescribed polarity is a case where the polarity is the same as the polarity generated between the body-side transmitting electrode 11 and the space-side transmitting electrode 12. Communication having the same polarity is performed between the transmitter 10 and the receiver 20 in a case where the body-side communication path 31 that is prescribed and includes the human body as the communication medium is established between the body-side transmitting electrode 11 and the body-side receiving electrode 21, or where the space-side communication path 32 that is prescribed and includes the space as the communication medium is established between the space-side transmitting electrode 12 and the space-side receiving electrode 22. In this case, the demodulation processor 24 determines that the communication is valid. In the case of determining that the communication is valid, the demodulation processor 24 outputs a demodulated reception signal as an output signal Sout.

In addition, the case where the polarity is different from the prescribed polarity is a case where the polarity is reverse to the polarity generated between the body-side transmitting electrode 11 and the space-side transmitting electrode 12. Communication having a reverse polarity is performed between the transmitter 10 and the receiver 20 in a case where a body-side path (a first communication path having reverse polarity) 33 that includes the human body as the communication medium is established between the body-side transmitting electrode 11 and the space-side receiving electrode 22, or where a space-side path (a second communication path having reverse polarity) 34 that includes the space as the communication medium is established between the space-side transmitting electrode 12 and the body-side receiving electrode 21. In this case, the demodulation processor 24 determines that the communication is invalid. In the case of determining that the communication is invalid, the demodulation processor 24 does not output the demodulated reception signal as the output signal Sout.

1.2 Specific Mode of Use of Communication System

FIGS. 2 and 3 illustrate a first example of a mode of use of the communication system. FIG. 2 illustrates a case where invalid communication is performed in the first example, and FIG. 3 illustrates a case where valid communication is performed in the first example.

In this first example, the receiver 20 is included in a mobile device 50. A user 30 uses the mobile device 50 by, for example, holding the mobile device 50 in one hand and operates the mobile device 50 by touching an operation surface of the mobile device 50 with a finger of one hand or a finger of the other hand, etc. In the mobile device 50, the body-side receiving electrode 21 is disposed, for example, in the operation surface to be touched by the finger, etc., in the mobile device 50. Meanwhile, the space-side receiving electrode 22, for example, is a structure configured by a metal in the mobile device 50, and is covered with a plastic housing in the mobile device 50. This avoids contact of the space-side receiving electrode 22 with the human body at a thickness smaller than a thickness of the plastic housing.

In this first example, as illustrated in FIG. 2, in a case where the user 30 is standing on a floor 40 and is not touching the body-side receiving electrode 21, the user 30 touching the body-side transmitting electrode 11 while holding the housing of the mobile device 50 has therefore a stronger linkage with the space-side receiving electrode 22 than with the body-side receiving electrode 21. Thus, the body-side path 33 that includes the human body as the communication medium is established between the body-side transmitting electrode 11 and the space-side receiving electrode 22. In addition, between the space-side transmitting electrode 12 and the body-side receiving electrode 21, the space-side path 34 that includes the space as the communication medium is established. Thus, communication having a reverse polarity is performed between the transmitter 10 and the receiver 20. In this case, the demodulation processor 24 determines that the communication is invalid.

Whereas, as illustrated in FIG. 3, in a case where the user 30 is standing on the floor 40 and touches the body-side receiving electrode 21, the user 30 touching the body-side transmitting electrode 11 has a stronger linkage with the body-side receiving electrode 21 that is in contact with the user 30 than a linkage with the space-side receiving electrode 22 via the housing of the mobile device 50. Thus, the body-side communication path 31 that is prescribed and includes the human body as the communication medium is established between the body-side transmitting electrode 11 and the body-side receiving electrode 21. In addition, between the space-side transmitting electrode 12 and the space-side receiving electrode 22, the space-side communication path 32 that is prescribed and includes the space as the communication medium is established. Thus, communication having the same polarity is performed between the transmitter 10 and the receiver 20. In this case, the demodulation processor 24 determines that the communication is valid.

FIGS. 4 and 5 illustrate a second example of the mode of use of the communication system. FIG. 4 illustrates a case where invalid communication is performed in the second example, and FIG. 5 illustrates a case where valid communication is performed in the second example.

In this second example, the receiver 20 is included in a stationary device 51. The stationary device 51 is placed on, for example, a stand 41 disposed on the floor 40. The user 30 operates the stationary device 51 by, for example, touching an operation surface of the stationary device 51 with a finger, etc. In the stationary device 51, the body-side receiving electrode 21 is disposed in, for example, the operation surface to be touched by the finger, etc. in the stationary device 51. The space-side receiving electrode 22 is coupled to the stand 41 and the floor 40 at low impedance.

In this second example, as illustrated in FIG. 4, in a case where the user 30 is standing on the floor 40 and is not touching the body-side receiving electrode 21, space between the user 30 touching the body-side transmitting electrode 11 and the body-side receiving electrode 21 has high impedance, which is larger in magnitude than the impedance from the user 30 to the space-side receiving electrode 22 via a shoe, the floor 40, and the stand 41. Thus, the body-side path 33 that includes the human body, the floor 40, and the stand 41 as the communication medium is established between the body-side transmitting electrode 11 and the space-side receiving electrode 22. In addition, between the space-side transmitting electrode 12 and the body-side receiving electrode 21, the space-side path 34 that includes the space as the communication medium is established. Thus, communication having a reverse polarity is performed between the transmitter 10 and the receiver 20. In this case, the demodulation processor 24 determines that the communication is invalid.

Whereas, as illustrated in FIG. 5, in a case where the user 30 is standing on the floor 40 and touches the body-side receiving electrode 21, the impedance between the body-side transmitting electrode 11 and the body-side receiving electrode 21 becomes lower than the impedance from the user 30 to the space-side receiving electrode 22 via the shoe, the floor 40, and the stand 41. Thus, the body-side communication path 31 that is prescribed and includes the human body as the communication medium is established between the body-side transmitting electrode 11 and the body-side receiving electrode 21. In addition, between the space-side transmitting electrode 12 and the space-side receiving electrode 22, the space-side communication path 32 that is prescribed and includes the space as the communication medium is established. Thus, communication having the same polarity is performed between the transmitter 10 and the receiver 20. In this case, the demodulation processor 24 determines that the communication is valid.

FIGS. 6 and 7 illustrate a third example of the mode of use of the communication system. FIG. 6 illustrates a case where invalid communication is performed in the third example, and FIG. 7 illustrates a case where valid communication is performed in the third example.

In this third example, the receiver 20 is provided on a door. The space-side receiving electrode 22 is disposed on a door board 52. On the door board 52, a doorknob 53 is installed. The body-side receiving electrode 21 is disposed at the doorknob 53. The space-side receiving electrode 22 is coupled to the floor 40 via the door board 52 at low impedance.

The doorknob 53 at which the body-side receiving electrode 21 is disposed is so installed as to protrude with respect to the door board 52 on which the space-side receiving electrode 22 is disposed. It is preferable that the space-side receiving electrode 22 disposed on the door board 52 have larger surface area than the body-side receiving electrode 21 disposed at the doorknob 53. In a case where the door board 52 is a metal door, the door board 52 as a whole may be the space-side receiving electrode 22. In addition, in a case where the doorknob 53 is made of metal, the doorknob 53 as a whole may be the body-side receiving electrode 21.

In this third example, as illustrated in FIG. 6, in a case where the user 30 is standing on the floor 40 and is not touching the doorknob 53 at which the body-side receiving electrode 21 is disposed, the space between the user 30 touching the body-side transmitting electrode 11 and the body-side receiving electrode 21 has high impedance, which is larger in magnitude than the impedance from the user 30 to the space-side receiving electrode 22 via the shoe and the floor 40. Thus, the body-side path 33 that includes the human body, the floor 40, and the door board 52 as the communication medium is established between the body-side transmitting electrode 11 and the space-side receiving electrode 22. In addition, between the space-side transmitting electrode 12 and the body-side receiving electrode 21, the space-side path 34 that includes the space as the communication medium is established. Thus, communication having a reverse polarity is performed between the transmitter 10 and the receiver 20. In this case, the demodulation processor 24 determines that the communication is invalid.

Whereas, as illustrated in FIG. 7, in a case where the user 30 is standing on the floor 40 and touches the doorknob 53 at which the body-side receiving electrode 21 is disposed, the impedance between the body-side transmitting electrode 11 and the body-side receiving electrode 21 becomes lower than the impedance from the user 30 to the space-side receiving electrode 22 via the shoe and the floor 40. Thus, the body-side communication path 31 that is prescribed and includes the human body as the communication medium is established between the body-side transmitting electrode 11 and the body-side receiving electrode 21. In addition, between the space-side transmitting electrode 12 and the space-side receiving electrode 22, the space-side communication path 32 that is prescribed and includes the space as the communication medium is established. Thus, communication having the same polarity is performed between the transmitter 10 and the receiver 20. In this case, the demodulation processor 24 determines that the communication is valid.

FIGS. 8 and 9 illustrate a fourth example of the mode of use of the communication system. FIG. 8 illustrates a case where invalid communication is performed in the fourth example, and FIG. 9 illustrates a case where valid communication is performed in the fourth example.

This fourth example assumes the mode of use at a gate that the user 30 passes through, such as a railway ticket gate and a gate for entrance and exit control. In this fourth example, the receiver 20 is provided at the gate. The body-side receiving electrode 21 is board-shaped metal and disposed on the floor 40 of the gate with a sufficient insulation provided from the floor 40. The space-side receiving electrode 22 is disposed on a side wall 54 of the gate. The space-side receiving electrode 22 is coupled to the floor 40 via the side wall 54 of the gate at low impedance.

In this fourth example, as illustrated in FIG. 8, in a case where the user 30 is not touching, i.e., not standing on the board-shaped metal that is disposed, as the body-side receiving electrode 21, on the floor 40 of the gate, the space between the user 30 touching the body-side transmitting electrode 11 and the body-side receiving electrode 21 has high impedance, which is larger in magnitude than the impedance from the user 30 to the space-side receiving electrode 22 via the shoe and the floor 40. Thus, the body-side path 33 that includes the human body, the floor 40, and the side wall 54 of the gate as the communication medium is established between the body-side transmitting electrode 11 and the space-side receiving electrode 22. In addition, between the space-side transmitting electrode 12 and the body-side receiving electrode 21, the space-side path 34 that includes the space as the communication medium is established. Thus, communication having a reverse polarity is performed between the transmitter 10 and the receiver 20. In this case, the demodulation processor 24 determines that the communication is invalid.

Whereas, as illustrated in FIG. 9, in a case where the user 30 is touching, i.e., standing on the board-shaped metal that is disposed, as the body-side receiving electrode 21, on the floor 40 of the gate, the impedance between the body-side transmitting electrode 11 and the body-side receiving electrode 21 becomes lower than the impedance from the user 30 to the space-side receiving electrode 22 via the space and the floor 40. Thus, the body-side communication path 31 that is prescribed and includes the human body as the communication medium is established between the body-side transmitting electrode 11 and the body-side receiving electrode 21. In addition, between the space-side transmitting electrode 12 and the space-side receiving electrode 22, the space-side communication path 32 that is prescribed and includes the space as the communication medium is established. Thus, communication having the same polarity is performed between the transmitter 10 and the receiver 20. In this case, the demodulation processor 24 determines that the communication is valid.

1.3 Specific Example of Each of Transmission Signal and Reception Signal

FIG. 10 illustrates one example of a signal waveform of each of the transmission signal and the reception signal.

FIG. 10 illustrates, as a waveform of the transmission signal, a waveform of voltage V1 at the space-side transmitting electrode with respect to the body-side transmitting electrode 11. In addition, FIG. 10 illustrates, as a waveform of the reception signal, a waveform of voltage V2 at the space-side receiving electrode 22 with respect to the body-side receiving electrode 21.

The demodulation processor 24 determines that communication is valid in a case where the reception signal generated between the body-side receiving electrode 21 and the space-side receiving electrode 22 has the prescribed polarity (the same polarity). The demodulation processor 24 determines that the communication is invalid in a case where the reception signal has a polarity different from the prescribed polarity (in the case of the reverse polarity).

FIG. 11 illustrates one example of a modulation scheme that is not usable for polarity identification in the demodulation processor 24. FIG. 12 illustrates one example of a modulation scheme that is usable for polarity identification in the demodulation processor 24.

FIGS. 11 and 12 illustrate respective examples of: data of the transmission signal, a modulated waveform of the transmission signal, a polarity inversion waveform resulting from inverting the polarity of the modulated waveform, and data of a demodulated signal of the polarity inversion waveform. The data of the transmission signal corresponds to the input signal Sin that is inputted to the transmission driver 13. The transmission signal is modulated in the transmission driver 13. To the body-side transmitting electrode 11 and the space-side transmitting electrode 12, a voltage of the modulated transmission signal is applied.

FIG. 11 illustrates an example of digital FM (Frequency Modulation) modulation as an example of the modulation scheme that is not usable for polarity identification. In the digital FM modulation, the modulated waveform is inverted at bit center when the transmission signal has a value 1, and is not inverted when the transmission signal has a value 0. In the digital FM modulation, the polarity of the modulated waveform is constantly inverted at a bit boundary of the transmission signal. In the digital FM modulation, even upon inversion of the polarity of the modulated waveform, the data of the demodulated signal is the same as the data of the transmission signal. Thus, demodulation to the original signal is possible. For this reason, the modulation scheme is not usable for polarity identification.

FIG. 12 illustrates an example using a Manchester code, as an example of the modulation scheme that is usable for polarity identification. In a case of using the Manchester code, in the modulated waveform, a first-half bit becomes 1 and a second-half bit becomes 0 when the bit of the transmission signal is 1. In addition, in the modulated waveform, the first-half bit becomes 0 and the second-half bit becomes 1 when the bit of the transmission signal is 0. In the case of using the Manchester code, the polarity of the modulated waveform is constantly inverted at bit center of the transmission signal. In the case of using the Manchester code, upon inversion of the polarity of the modulated waveform, the data of the demodulated signal has a value different from a value of the data of the transmission signal. Thus, demodulation to the original signal is not possible. For this reason, the modulation scheme is usable for polarity identification.

FIG. 13 illustrates one example of a packet configuration of the transmission signal. The transmission signal may be packet data. A packet of the transmission signal includes, for example, a preamble, a synchronizing signal (SYNC), a payload, and a CRC. The preamble is data having a simple repeating pattern and inserted at a top position of the packet for a purpose such as performing clock synchronization with a circuit of the receiver 20. The payload is actual data of the transmission signal. The CRC (Cyclic Redundancy Code) is code data that allows searching whether or not the payload has a transmission error.

FIG. 14 illustrates one example of the synchronizing signal.

The synchronizing signal is used to detect a start of the packet, to thereby precisely find out at which bit valid data starts. The synchronizing signal is also referred to as a SYNC pattern. For example, known data is inserted at the top position of the payload as the synchronizing signal. FIG. 14 illustrates an example in which portion of the data of the synchronizing signal has an irregular value in the packet configured using the Manchester code. As described above, in a case of using the Manchester code, there is a rule that in the modulated waveform, a polarity is constantly inverted at a bit center. In the example in FIG. 14, portion of values become irregular, resulting in deviation of the modulated waveform from the rule of modulation.

Inclusion in the transmission signal of the synchronizing signal that includes the known data allows the demodulation processor 24, upon demodulation, to recognize that the signal has been transmitted through a communication path different from the prescribed communication path. Upon detecting a correct SYNC pattern during the demodulation, the demodulation processor 24 recognizes a start of a correct transmission signal. In a case where a SYNC pattern having a reverse polarity is detected during the demodulation, the demodulation processor 24 recognizes that the transmission signal has passed through a communication path having the reverse polarity.

1.4 Effects

As described above, according to the embodiment of the disclosure, it is determined that communication is valid in a case where the reception signal generated between the body-side receiving electrode 21 and the space-side receiving electrode 22 has the prescribed polarity; whereas, it is determined that the communication is invalid in a case where the reception signal has the polarity different from the prescribed polarity. This enables communication only in the predetermined communication path.

According to the embodiment of the disclosure, as various types of mode of use illustrated in FIGS. 2 to 9, it is possible to realize a body communication system that enables communication only in a case where the user 30 touches a vicinity of the body-side receiving electrode 21. In addition, it is possible to realize a body communication system that disables communication in a case where the user 30 is not touching the vicinity of the body-side receiving electrode 21. This allows avoiding unintended body communication, and significantly improves reliability in security of the body communication system in the case of application to, for example, security field.

It is to be noted that effects described herein are merely exemplified and are not limited, and that effects may further include other effects than the effects described herein. The same applies to effects of other embodiments described hereinafter.

In addition, the embodiment above has been described using a phrase that expresses a state of the human body or the user 30 having contact with an electrode, etc., but having contact with the electrode as described herein also encompasses having contact with the electrode via an insulating layer that is sufficiently thin. This serves as a measure to prevent the human body from metal allergy or prevent metal from corrosion.

1.5 Comparative Example

As a comparative example, the following describes a configuration of a communication system as described in PTL 1 (Japanese Unexamined Patent Application Publication No. 2011-120145) and an issue thereof.

FIGS. 15 to 17 each illustrate a configuration example of the communication system according to the comparative example. FIG. 15 illustrates one example of a case where invalid communication is performed in the communication system according to the comparative example. FIG. 16 illustrates one example of a case where valid communication is performed in the communication system according to the comparative example. FIG. 17 illustrates one example of a case where a false determination is made in the communication system according to the comparative example.

In a technique according to the disclosure, whether or not communication is valid is determined, in the receiver 20, in accordance with the polarity between the body-side receiving electrode 21 and the space-side receiving electrode 22. Whereas, in the communication system according to the comparative example, whether or not communication is valid is determined in accordance with the polarity of the body-side receiving electrode 21 with respect to the GND and the polarity for the space-side receiving electrode 22 with respect to the GND.

In the communication system according to the comparative example, the body-side transmitting electrode 11 and the space-side transmitting electrode 12 transmit to each other a transmission signal having a different polarity. In FIGS. 15 to 17, as one example, the space-side transmitting electrode 12 is assumed to have a positive (+) polarity, and the body-side transmitting electrode 11 is assumed to have a negative (−) polarity.

As illustrated in FIG. 15, in the communication system according to the comparative example, it is determined that communication is invalid in a case where each of the body-side receiving electrode 21 and the space-side receiving electrode 22 has received a signal having the same polarity with respect to the GND. Whereas, as illustrated in FIG. 16, it is determined that the communication is valid in a case where each of the body-side receiving electrode 21 and the space-side receiving electrode 22 has received a signal having a different polarity with respect to the GND.

Here, since the GND is voltage somewhere between the body-side receiving electrode 21 and the space-side receiving electrode 22, polarity reversal is not caused as a result of unstable GND potential. In the communication system according to the comparative example, there is a possibility of being unable to detect the signal due to reception voltage being too low at one receiving electrode, depending on a difference in strength of linkage (magnitude of impedance) between the GND and each of the body-side transmitting electrode 11 and the space-side transmitting electrode 12.

For example, as illustrated in FIG. 17, with a portion of the human body coming closer to the space-side receiving electrode 22 than to the space-side transmitting electrode 12, the linkage between the human body and the space-side receiving electrode 22 becomes stronger, whereas the linkage between the space-side transmitting electrode 12 and the GND becomes stronger. This results in negative (−) polarity at the space-side receiving electrode 22. As a result, since the body-side receiving electrode 21 and the space-side receiving electrode 22 have the same polarity with respect to the GND, it is determined that the communication is invalid despite the user 30 being in an appropriate position, thus resulting in a false determination.

2. Other Embodiments

A technique according to the disclosure is not limited to the embodiment described above and allows performing various modifications.

For example, the technology may have the following configuration.

(1)

A communication system including:

a transmitter that includes a first transmitting electrode and a second transmitting electrode, and causes a transmission signal to be generated between the first transmitting electrode and the second transmitting electrode; and a receiver including a first receiving electrode, a second receiving electrode, and a determiner, the first receiving electrode and the second receiving electrode each receiving the transmission signal through a communication path that includes a human body, the determiner determining that communication is valid in a case where a reception signal has a prescribed polarity, and determining that the communication is invalid in a case where the reception signal has a polarity different from the prescribed polarity, the reception signal being generated between the first receiving electrode and the second receiving electrode.

(2)

The communication system according to (1), in which the transmission signal includes a signal modulated in accordance with a predetermined modulation scheme in which a value, when demodulated, changes upon inversion of a polarity of the signal.

(3)
The communication system according to (2), in which
the transmission signal includes a synchronizing signal modulated in accordance with the predetermined modulation scheme, and
the determiner identifies the polarity of the reception signal, on a basis of the synchronizing signal that is demodulated.
(4)
The communication system according to any one of (1) to (3), in which the first transmitting electrode is disposed at a side closer to the human body than to the second transmitting electrode.
(5)
The communication system according to (4), in which, with a portion of the human body coming closer to the first receiving electrode than to the second receiving electrode,
a first communication path is established between the first transmitting electrode and the first receiving electrode, the first communication path being prescribed and including the human body as a communication medium, and
a second communication path is established between the second transmitting electrode and the second receiving electrode, the second communication path being prescribed and including space as the communication medium.
(6)
The communication system according to any one of (1) to (5), in which
the first receiving electrode is disposed at a doorknob, and
the second receiving electrode is disposed on a door board on which the doorknob is installed.
(7)
The communication system according to any one of (1) to (5), in which
the first receiving electrode is disposed on a floor of a gate through which a user passes, and
the second receiving electrode is disposed on a side wall of the gate.
(8)
A communication method including:
generating, in a transmitter that includes a first transmitting electrode and a second transmitting electrode, a transmission signal between the first transmitting electrode and the second transmitting electrode; and
determining, in a receiver that includes a first receiving electrode and a second receiving electrode each receiving the transmission signal through a communication path that includes a human body, that communication is valid in a case where a reception signal has a prescribed polarity, and that the communication is invalid in a case where the reception signal has a polarity different from the prescribed polarity, the reception signal being generated between the first receiving electrode and the second receiving electrode.
(9)
A receiver including:
a first receiving electrode and a second receiving electrode each receiving a transmission signal through a communication path that includes a human body, the transmission signal being generated between a first transmitting electrode and a second transmitting electrode; and
a determiner determining that communication is valid in a case where a reception signal has a prescribed polarity, and determining that the communication is invalid in a case where the reception signal has a polarity different from the prescribed polarity, the reception signal being generated between the first receiving electrode and the second receiving electrode.

This application claims the benefit of Japanese Priority Patent Application JP2015-256641 filed with the Japan Patent Office on Dec. 28, 2015, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A communication system, comprising:
a transmitter that includes a first transmitting electrode and a second transmitting electrode, wherein the transmitter is configured to generate a transmission signal between the first transmitting electrode and the second transmitting electrode; and
a receiver including a first receiving electrode, a second receiving electrode, and a determiner, wherein
the first receiving electrode is configured to receive the transmission signal via a first communication path that includes a human body,
the second receiving electrode is configured to receive the transmission signal via a second communication path,
the receiver is configured to generate a reception signal between the first receiving electrode and the second receiving electrode, and
the determiner is configured to:
determine a communication between the transmitter and the receiver is valid based on a determination that a polarity of the reception signal is a specific polarity, wherein the specific polarity corresponds to a polarity generated between the first transmitting electrode and the second transmitting electrode; and
determine the communication is invalid based on a determination that the polarity of the reception signal is different from the specific polarity, wherein the invalid communication is through one of
a third communication path between the first transmitting electrode and the second receiving electrode, or
a fourth communication path between the second transmitting electrode and the first receiving electrode.

2. The communication system according to claim 1, wherein
the transmission signal includes a first signal,
modulation of the first signal is based on a specific modulation scheme, and
in the specific modulation scheme, a value associated with the first signal changes based on demodulation of the first signal and inversion of a polarity of the first signal.

3. The communication system according to claim 2, wherein
the transmission signal further includes a synchronizing signal,
modulation of the synchronizing signal is based on the specific modulation scheme, and
the determiner is further configured to determine the polarity of the reception signal, based on demodulation of the synchronizing signal.

4. The communication system according to claim 1, wherein the first transmitting electrode is closer to the human body than to the second transmitting electrode.

5. The communication system according to claim 4, wherein
the first communication path between the first transmitting electrode and the first receiving electrode is based on a portion of the human body that is closer to the first receiving electrode than to the second receiving electrode,
the first communication path includes the human body as a communication medium,
the second communication path between the second transmitting electrode and the second receiving electrode is based on the portion of the human body that is closer to the first receiving electrode than to the second receiving electrode, and
the second communication path includes space, between the second transmitting electrode and the second receiving electrode, as the communication medium.

6. The communication system according to claim 1, wherein
the first receiving electrode is at a doorknob,
the doorknob is on a door board, and
the second receiving electrode is on the door board.

7. The communication system according to claim 1, wherein
the first receiving electrode is on a floor of a gate, and
the second receiving electrode is on a side wall of the gate.

8. A communication method, comprising:
generating, in a transmitter that includes a first transmitting electrode and a second transmitting electrode, a transmission signal between the first transmitting electrode and the second transmitting electrode;
receiving, by a first receiving electrode the transmission signal via a first communication path that includes a human body;
receiving, by a second receiving electrode, the transmission signal via a second communication path;
generating, in a receiver that includes the first receiving electrode and the second receiving electrode, a reception signal between the first receiving electrode and the second receiving electrode;
determining, by the receiver, a communication between the transmitter and the receiver is valid based on a determination that a polarity of the reception signal is a specific polarity, wherein the specific polarity corresponds to a polarity generated between the first transmitting electrode and the second transmitting electrode; and
determining, by the receiver, the communication is invalid based on a determination that the polarity of the reception signal is different from the specific polarity, wherein the invalid communication is through one of
a third communication path between the first transmitting electrode and the second receiving electrode, or
a fourth communication path between the second transmitting electrode and the first receiving electrode.

9. A receiver, comprising:
a first receiving electrode configured to receive a transmission signal via a first communication path that includes a human body;
a second receiving electrode configured to receive the transmission signal via a second communication path, wherein
generation of the transmission signal is between a first transmitting electrode of a transmitter and a second transmitting electrode of the transmitter, and
the receiver is configured to generate a reception signal between the first receiving electrode and the second receiving electrode; and
a determiner configured to:
determine a communication between the receiver and the transmitter is valid based on a determination that a polarity of the reception signal is a specific polarity, wherein the specific polarity corresponds to a polarity generated between the first transmitting electrode and the second transmitting electrode; and
determine the communication is invalid based on a determination that the polarity of the reception signal is different from the specific polarity, wherein the invalid communication is through one of
a third communication path between the first transmitting electrode and the second receiving electrode, or
a fourth communication path between the second transmitting electrode and the first receiving electrode.

* * * * *